(12) United States Patent
Lee et al.

(10) Patent No.: US 8,596,647 B2
(45) Date of Patent: Dec. 3, 2013

(54) ACTIVE ROLL CONTROL SYSTEM

(75) Inventors: Un Koo Lee, Seoul (KR); Sung Bae Jang, Suwon-si (KR); Pil Young Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/561,576

(22) Filed: Jul. 30, 2012

(65) Prior Publication Data

US 2013/0147140 A1 Jun. 13, 2013

(30) Foreign Application Priority Data

Dec. 9, 2011 (KR) ........................ 10-2011-0132274

(51) Int. Cl.
*B60G 17/015* (2006.01)
*B60G 21/055* (2006.01)

(52) U.S. Cl.
USPC .......... 280/5.508; 280/124.106; 280/124.107; 280/124.152; 280/5.52

(58) Field of Classification Search
USPC ........ 280/5.506–5.508, 5.511, 5.52, 124.106, 280/124.107, 124.13, 124.149, 124.152
See application file for complete search history.

(56) References Cited

U.S. PATENT DOCUMENTS

| | | | |
|---|---|---|---|
| 4,892,329 A | 1/1990 | Kozaki et al. | |
| 5,186,486 A | 2/1993 | Hynds et al. | |
| 6,175,792 B1 | 1/2001 | Jones et al. | |
| 6,254,114 B1 | 7/2001 | Pulling et al. | |
| 7,325,820 B2 | 2/2008 | Allen et al. | |
| 7,377,529 B2 | 5/2008 | Green | |
| 7,427,073 B2 | 9/2008 | Won | |
| 7,766,344 B2 | 8/2010 | Buma | |
| 8,302,973 B2 | 11/2012 | Lee et al. | |
| 8,398,092 B2* | 3/2013 | Lee et al. | 280/5.507 |
| 8,408,559 B1* | 4/2013 | Lee et al. | 280/5.508 |
| 2001/0054801 A1 | 12/2001 | Perello et al. | |
| 2009/0288297 A1 | 11/2009 | Schmidt et al. | |
| 2012/0306177 A1* | 12/2012 | Thill | 280/124.152 |

FOREIGN PATENT DOCUMENTS

| | | |
|---|---|---|
| JP | 5-5557 U | 1/1993 |
| JP | 5-213040 A | 8/1993 |
| JP | 10-297312 A | 11/1998 |
| JP | 2001-520602 A | 10/2001 |
| JP | 2002-114064 A | 4/2002 |
| JP | 2007-182229 A | 7/2007 |
| JP | 4095277 B2 | 3/2008 |
| JP | 2010-042798 A | 2/2010 |
| KR | 1998-045430 A | 9/1998 |

(Continued)

*Primary Examiner* — Ruth Ilan

(74) *Attorney, Agent, or Firm* — Morgan, Lewis & Bockius LLP

(57) ABSTRACT

An active roll control device utilizes a driving torque to move a suspension arm side connection point of a stabilizer link that connects both sides of a stabilizer bar with a suspension arm along a sliding unit such that roll of a vehicle is actively controlled. The sliding unit includes a linear shaft that extends in a vehicle width direction in a housing on the suspension arm, a linear bushing into which the linear shaft is inserted to be slidably moved along the linear shaft in the housing, and a bushing housing that is fixed on an external circumference of the linear bushing, a double ball joint is fixed on an inner side thereof to connect the bushing housing, and the double ball joint is connected to a drive shaft of the drive source through one end of a push rod and a lower end of the stabilizer link.

4 Claims, 4 Drawing Sheets

(56) References Cited

FOREIGN PATENT DOCUMENTS

| | | |
|---|---|---|
| KR | 10-0629799 B1 | 9/2006 |
| KR | 10-0665320 B1 | 12/2006 |
| KR | 10-2007-0104051 A | 10/2007 |
| KR | 10-2009-0061989 A | 6/2009 |
| KR | 10-2009-0098039 A | 9/2009 |
| KR | 10-0980879 B1 | 9/2010 |

* cited by examiner

ACTIVE ROLL CONTROL SYSTEM

CROSS-REFERENCE TO RELATED APPLICATION

The present application claims priority of Korean Patent Application Number 10-2011-0132274 filed Dec. 9, 2011, the entire contents of which application is incorporated herein for all purposes by this reference.

BACKGROUND OF INVENTION

1. Field of Invention

The present invention relates to an active roll control device of a vehicle. More particularly, the present invention relates to an active roll control device (ARCS: Active Roll Control System) that actively controls roll with a stabilizer bar that is disposed at both suspension arms through a stabilizer link.

2. Description of Related Art

Generally, a suspension system of a vehicle connects an axle with a vehicle body, and prevents vibration or impact that is transferred from the road from being transferred to the vehicle body while driving to enhance ride comfort.

The suspension system includes a chassis spring that reduces impact transferred from the road, a shock absorber that dampens free vibration of the chassis spring to improve ride comfort, and a stabilizer bar that reduces roll of a vehicle.

The stabilizer bar is fixed on a vehicle body and both end portions thereof are respectively fixed to a lower arm or a strut bar through a stabilizer link.

Accordingly, the stabilizer bar is not operated while left and right wheels are equally moved up/down and reduces roll of a vehicle body through a torsion elastic force while the left and right wheels are differently moved up/down.

FIG. 1 is a partial perspective view of a suspension system for a vehicle that uses an active roll control device according to a conventional art.

Referring to FIG. 1, an active roll control device of a conventional art improves a roll characteristic of a vehicle by varying rigidity of a stabilizer bar 1 according to a driving condition of a vehicle.

The active roll control device includes a stabilizer bar 1, a stabilizer link 3, a sliding unit 5 that is disposed on a lower arm 7 as a suspension arm, and a drive source 6.

The stabilizer bar 1 is mounted on a bracket 13 of a sub-frame 11 at a vehicle body side through a mounting bushing 15.

Also, one end of the stabilizer link 3 is connected to one end of the stabilizer bar 1 through a ball joint (BJ).

Meanwhile, an outer end portion of the lower arm 7 is connected to a lower side of a knuckle 17 and includes a housing portion 21 to form the sliding unit 5.

The sliding unit 5 includes a slide rail 23 at both sides of the inside of the housing portion 21 on the lower arm 7 in a vehicle width direction, and a connector 25 that is connected to a lower end of the stabilizer link 3 is disposed between the slide rail 23 to be guided in a vehicle width direction.

The drive source 6 includes a motor 19 having a drive shaft 27 that is operated in both directions and is disposed at one side of the sub-frame 11, and the drive shaft 27 is connected to the connector 25 through a push rod 29 to draw or push the connector 25.

The conventional active roll control device that is configured as described above adjusts a connection position of the stabilizer link 3 on the lower arm 7 through the operation of the motor 19 according to the driving condition of the vehicle, and actively controls the lever ratio of the stabilizer link 3 to adjust the roll rigidity and the turning stability of the vehicle.

Meanwhile, because the above active roll control device is disposed in a narrow space that is formed at a lower portion of a vehicle body, the system has to be compact, but frictional resistance of the sliding unit is a factor that deteriorates the size reduction of the drive source 6.

For this, recently there has been a demand for minimizing the frictional resistance between the connector 25 and the slide rail 23 of the sliding unit 5 such that power delivery efficiency of the motor 19 as a drive source is improved to enable the size reduction.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an active roll control device having advantages of connecting a bushing housing having a linear bushing that slides along both side linear shafts to a stabilizer link and a push rod through a double ball joint and absorbing a vertical load that is applied to the sliding unit and moment loads that are transferred from various directions to minimize frictional resistance.

Various aspects of the present invention provide for an active roll control device that uses a driving torque that is transferred from a drive source to move a suspension arm side connection point of a stabilizer link that connects both sides of a stabilizer bar with a suspension arm along a sliding unit such that roll of a vehicle is actively controlled, wherein the sliding unit includes a linear shaft that is disposed in parallel at both sides along a vehicle width direction in a housing portion that is formed on the suspension arm, a linear bushing into which the linear shaft is inserted to be slidably moved along the linear shaft in the housing portion, and a bushing housing that is fixed on an external circumference of the linear bushing, a double ball joint is fixed on an inner side thereof to connect the bushing housing, and the double ball joint is connected to a drive shaft of the drive source through one end of a push rod and a lower end of the stabilizer link.

Both end portions of the linear shaft may be respectively fixed on a rear/front side of the inside of the housing through a fixed bracket.

A dust cover may cover the linear shaft, one end of the dust cover is connected to the fixed bracket, and the other end thereof is connected to the bushing housing.

The bushing housing may include a socket groove that is formed between both linear shafts, and both ends of a center shaft of the double ball joint are inserted into the socket groove to be fixed thereto.

The bushing housing may have a linear bushing that slides along both side linear shafts adjusts a connection position of the stabilizer link on the suspension arm by using the driving torque of the motor inside the housing portion of the suspension arm according to the driving conditions of the vehicle such that the roll rigidity of the vehicle is actively controlled to improve the turning stability of the vehicle.

Also, the linear bushing slides along both side linear shaft of the sliding portion such that the sliding unit absorbs the vertical load that is applied thereto and the moment loads of various directions to minimize the frictional resistance.

Thereby, the power delivery efficiency of the motor is improved to be able to reduce the size of the system.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
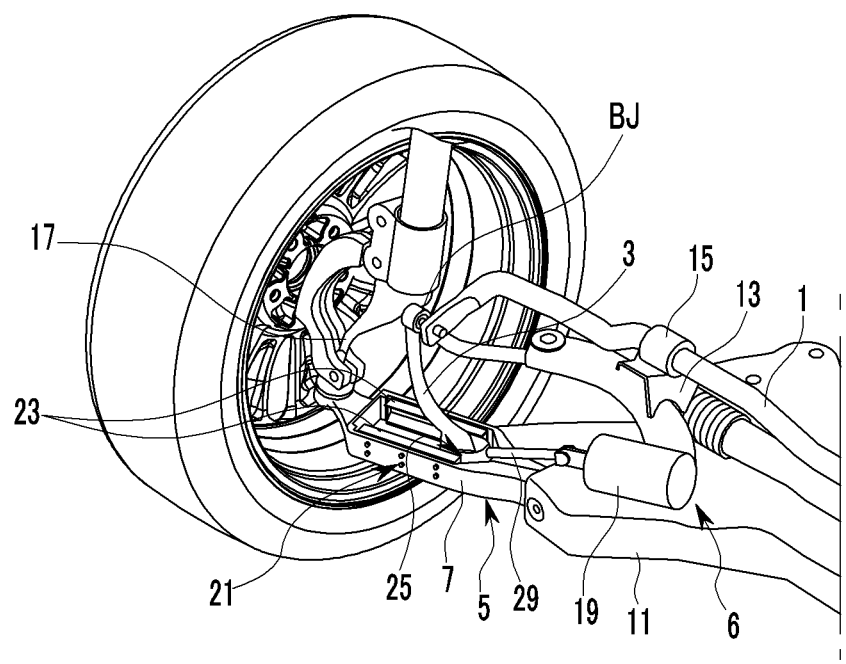
FIG. 1 is a partial perspective view of a suspension system for a vehicle to which a conventional active roll control device is applied.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Figure 2:
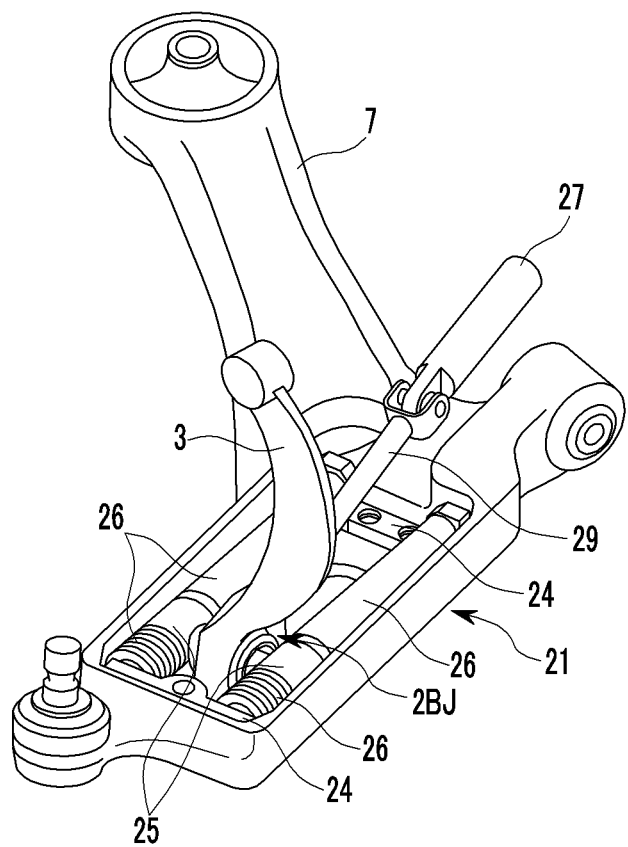
FIG. 2 is a perspective view of a lower arm that is assembled to the sliding unit that is applied to an exemplary active roll control device according to the present invention.
Figure 3:
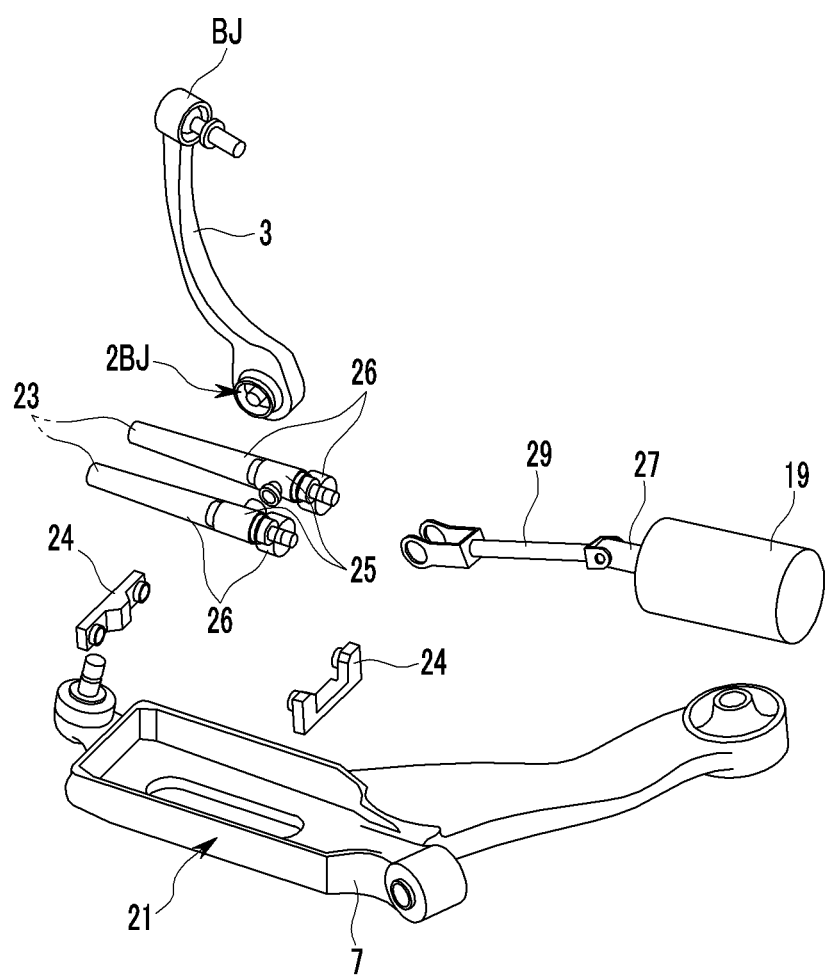
FIG. 3 is an exploded perspective view of a sliding unit that is applied to an exemplary active roll control device according to the present invention.
Figure 4:
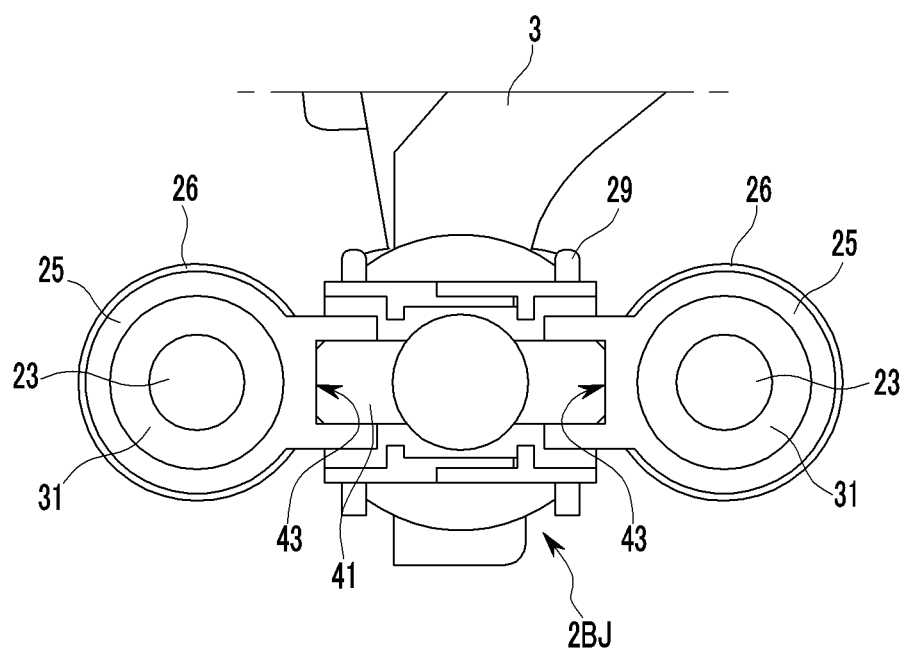
FIG. 4 is a cross-sectional view of a sliding unit that is applied to an exemplary active roll control device according to the present invention.

FIG. 2 is a perspective view of a lower arm that is assembled to a sliding unit that is applied to an active roll control device according to various embodiments of the present invention, FIG. 3 is an exploded perspective view of a sliding unit that is applied to an active roll control device according to various embodiments of the present invention, and FIG. 4 is a cross-sectional view of a sliding unit that is applied to an active roll control device according to various embodiments of the present invention.

Referring to FIG. 2 to FIG. 4, an active roll control device according to various embodiments of the present invention varies a rigidity value of the stabilizer bar 1 depending on the driving conditions of the vehicle to actively improve the roll of the vehicle.

As shown in FIG. 1, the active roll control device basically includes the stabilizer bar 1, a stabilizer link 3, a sliding unit 5 that is formed on a lower arm 7 that is a suspension arm, and a drive source 6.

Both sides of the stabilizer bar 1 are disposed on a bracket 13 of a sub-frame 11 at a vehicle body side through a mounting bushing 15.

And, an upper end of the stabilizer link 3 is connected to one end of the stabilizer bar 1 through a ball joint (BJ).

Meanwhile, an outside end portion of the lower arm 7 is connected to a lower side of the knuckle 17 and forms a housing portion 21 at one side thereof to house the sliding unit 5.

Referring to FIGS. 2 and 3, the sliding unit 5 includes a linear shaft 23 that is disposed at both sides of the inside of the housing portion 21 on the lower arm 7 and a bushing housing 25 is respectively disposed on the linear shaft 23 to be connected to a lower end of the stabilizer link 3, wherein the bushing housing 25 is guided in a vehicle width direction along the linear shaft 23.

Also, the drive source 6 includes a motor 19 that has a drive shaft 27 that is moved forward/reward to be disposed at one side of the sub-frame 11, and the drive shaft 27 is connected to both sides bushing housing 25 through the push rod 29 and pushes or draws the bushing housing 25.

Accordingly, the active roll control device having such a structure as described above adjusts a connection position of the stabilizer link 3 on the lower arm 7 through the operation of the motor 19 depending on the driving conditions of the vehicle to vary the lever ratio of the stabilizer link 3 such that the roll rigidity of the vehicle is actively controlled to improve the turning stability of the vehicle.

Meanwhile, such active roll control device is disposed in a narrow space that is formed at a lower portion of the vehicle body and therefore has to have a compact structure, and for this, frictional resistance of the sliding unit 5 is minimized to enhance the power delivery efficiency of the motor 19 in various embodiments of the present invention such that the drive source 6 is reduced in size.

Hereinafter, referring to FIG. 3 and FIG. 4, the configuration of the sliding unit 5 will be described.

As shown, the sliding unit 5 includes the linear shaft 23, the bushing housing 25, and a linear bushing 31.

Two linear shafts 23 are disposed in parallel at both sides along a vehicle width direction inside the housing portion 21, and both ends of the linear shafts 23 are inserted into the fixed bracket 24 that is fixed on a rear/front inner surface of the inside of the housing portion 21 to be fixed.

In this configuration, the linear bushing 31 is slidably disposed on the linear shaft 23 along an axial direction.

Also, the linear bushing 31 that is disposed on the linear shaft 23 is forcibly inserted into an interior circumference of the bushing housing 25 and is disposed to be moved along the linear shaft 23 together with the linear bushing 31.

The bushing housing 25 has a socket groove 43 that is formed therebetween.

That is, both ends of the center shaft 41 of a double ball joint 2BJ that is connected to the push rod 29 of the drive shaft 27 of the motor 19 and to the stabilizer link 3 are respectively inserted into the socket groove 43 such that the bushing housing 25 is simultaneously connected to the push rod 29 and the stabilizer link 3.

A dust cover 26 that is flexibly transformed covers the linear shaft 23 to prevent foreign materials from entering.

That is, a dust cover 26 is disposed at both sides across the bushing housing 25 on the linear shaft 23 and both ends thereof are fixed on the bushing housing 25 and the fixed bracket 24.

In this configuration, the dust cover 26 is folded in a short stroke or unfolded in a long stroke depending on the position of the bushing housing 25 on the linear shaft 23.

Accordingly, the sliding unit 5 having such a structure as described above absorbs a vertical load and moment load of various directions that are transferred between the linear shaft 23 and the linear bushing 31 and also enables the linear bushing 32 to be slid on the linear shaft 23 while the vehicle variously moves, particularly in a bump or rebound condition, such that the power delivery efficiency of the motor 19 is enhanced.

That is, while a vertical load is generated in the bump or rebound condition of the vehicle, a circularly distributed load that is formed between the linear shaft 23 and the linear bushing 31 minimizes the frictional resistance of the sliding.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active roll control device that uses a driving torque transferred from a drive source to move a suspension arm side connection point of a stabilizer link that connects a respective side of a stabilizer bar with a suspension arm along a sliding unit such that roll of a vehicle is actively controlled, wherein the sliding unit includes:
   two linear shafts disposed parallel to a vehicle width direction in a housing portion formed on the suspension arm;
   wherein each linear shaft is inserted into a respective linear bushing that is slidably moved along the linear shaft in the housing portion; and
   a respective bushing housing fixed on an external circumference of each linear bushing, a double ball joint is fixed on an inner side thereof to connect the bushing housing, and the double ball joint is connected to a drive shaft of the drive source through one end of a push rod and a lower end of the stabilizer link.

2. The active roll control device of claim 1, wherein both end portions of each linear shaft are respectively fixed on a rear/front side of the inside of the housing through a fixed bracket.

3. The active roll control device of claim 2, wherein a dust cover covers each linear shaft, one end of the dust cover is connected to the fixed bracket, and the other end thereof is connected to the bushing housing.

4. The active roll control device of claim 1, wherein each bushing housing includes a socket groove that is formed on an inside side thereof between both linear shafts, and both ends of a center shaft of the double ball joint are inserted into a respective socket groove to be fixed thereto.

* * * * *